(12) United States Patent
Nie

(10) Patent No.: US 7,130,269 B2
(45) Date of Patent: Oct. 31, 2006

(54) METHOD FOR TIMING THE OUTPUT OF DATA PACKETS FROM NETWORK NODES, A NETWORK NODE, AND A NETWORK

(75) Inventor: Xiaoning Nie, München (DE)

(73) Assignee: Infineon Technologies AG, Munich (DE)

( * ) Notice: Subject to any disclaimer, the term of this patent is extended or adjusted under 35 U.S.C. 154(b) by 948 days.

(21) Appl. No.: 10/023,152

(22) Filed: Dec. 17, 2001

(65) Prior Publication Data

US 2002/0110137 A1    Aug. 15, 2002

(30) Foreign Application Priority Data

Dec. 15, 2000  (DE) ................. 100 62 640

(51) Int. Cl.
*H04L 12/56* (2006.01)

(52) U.S. Cl. .............. 370/235; 370/395.4; 370/412; 370/429

(58) Field of Classification Search .......... 370/235.1, 370/230.1, 395.41, 395.42, 417
See application file for complete search history.

(56) References Cited

U.S. PATENT DOCUMENTS

| | | | | |
|---|---|---|---|---|
| 5,533,020 A | * | 7/1996 | Byrn et al. | 370/395.4 |
| 5,566,175 A | * | 10/1996 | Davis | 370/468 |
| 5,822,540 A | * | 10/1998 | Caldara et al. | 709/236 |
| 5,844,890 A | * | 12/1998 | Delp et al. | 370/230 |
| 5,892,762 A | * | 4/1999 | Okuda et al. | 370/395.42 |
| 5,913,074 A | * | 6/1999 | Ikeda et al. | 710/29 |
| 6,028,843 A | * | 2/2000 | Delp et al. | 370/235 |
| 6,049,527 A | * | 4/2000 | Isoyama et al. | 370/235 |
| 6,064,677 A | * | 5/2000 | Kappler et al. | 370/395.43 |
| 6,108,307 A | * | 8/2000 | McConnell et al. | 370/235 |
| 6,160,793 A | * | 12/2000 | Ghani et al. | 370/236 |
| 6,167,054 A | * | 12/2000 | Simmons et al. | 370/422 |
| 6,173,331 B1 | * | 1/2001 | Shimonishi | 709/232 |
| 6,208,619 B1 | * | 3/2001 | Takeuchi | 370/229 |
| 6,219,351 B1 | * | 4/2001 | Kilkki | 370/412 |
| 6,230,191 B1 | * | 5/2001 | Walker | 709/213 |
| 6,256,674 B1 | * | 7/2001 | Manning et al. | 709/232 |
| 6,411,617 B1 | * | 6/2002 | Kilkki et al. | 370/353 |
| 6,466,579 B1 | * | 10/2002 | Scott et al. | 370/395.71 |
| 6,473,432 B1 | * | 10/2002 | Nishimura et al. | 370/412 |
| 6,477,168 B1 | * | 11/2002 | Delp et al. | 370/395.4 |
| 6,625,118 B1 | * | 9/2003 | Hadi Salim et al. | 370/229 |
| 6,628,649 B1 | * | 9/2003 | Raj et al. | 370/360 |
| 6,643,256 B1 | * | 11/2003 | Shimojo et al. | 370/229 |
| 6,657,963 B1 | * | 12/2003 | Paquette et al. | 370/236 |
| 6,788,697 B1 | * | 9/2004 | Aweya et al. | 370/412 |
| 6,798,744 B1 | * | 9/2004 | Loewen et al. | 370/235 |
| 6,912,225 B1 | * | 6/2005 | Kohzuki et al. | 370/412 |

FOREIGN PATENT DOCUMENTS

EP    0 710 046 A2    5/1996

\* cited by examiner

*Primary Examiner*—Hassan Kizou
*Assistant Examiner*—Brian Roberts
(74) *Attorney, Agent, or Firm*—Laurence A. Greenberg; Werner H. Stemer; Ralph E. Locher

(57) ABSTRACT

A method for timing the output of data packets from network nodes, in which the current fill level of the buffer memory of a queue of the network node is first determined. The determined fill level of the buffer memory is compared with a predetermined lower limit for the fill level of the buffer memory. The output time of a data packet is assigned in dependence on the result of the comparison.

13 Claims, 2 Drawing Sheets

METHOD FOR TIMING THE OUTPUT OF DATA PACKETS FROM NETWORK NODES, A NETWORK NODE, AND A NETWORK

BACKGROUND OF THE INVENTION

Field of the Invention

The invention relates to a method for timing the output of data packets from network nodes, to a network node controlled in accordance with the method, and to a network that has network nodes controlled in accordance with the method.

In a network for data transmission purposes, a point at which various data transmission links come together is called a network node. Network nodes can be implemented by different network elements such as, for example, routers (i.e. data packet relays), switches, bridges, gateways (i.e. network interfaces), or hubs (system concentrators or star distributors).

Depending on the design of a network node, it exhibits switching tasks (router), conducts a protocol conversion (gateway), or effects hardware-based network interconnection (bridge, switch, hub) by evaluating address information from the individual data packets. However, the one thing that is common to the different embodiments is that data packets arrive at one or more inputs of the given network node, and are output at one or more outputs of the network node after a certain dwell time in the network node. Each output is associated with an interface having a fixed transmission rate.

In packet-switched data networks, a serious problem is presented when the data packets of a data stream have different delays between a fixed transmitter and a fixed receiver. Fluctuations of the delay of a data stream are called jitter. For time-critical applications such as e.g. voice or audio/video transmissions, e.g. via the Internet, it is of importance to provide mechanisms which limit both the delay and the jitter.

A known measure for reducing jitter in a network node consists of using a buffer memory between the input and the output of the network node. The buffer memory is capable of temporarily storing all of the data bits that arrive within the time of the longest jitter that is assumed. In this method, a dwell time D in the network node is defined and the arrival time a(p) of each data packet p at the input of the network node is noted. For each data packet, an output time a(p)+D is then calculated and each data packet is later output at the output of the network node exactly after the dwell time D has elapsed. This provides for an almost continuous, jitterless data stream at the output of the network node. However, it is disadvantageous in this method that the calculation of the output time (scheduling) and the forwarding of each data packet have to take place individually, which requires great expenditure. Furthermore, effective jitter limiting can require relatively long dwell times D in the network node. This increases the total delay in the data network.

SUMMARY OF THE INVENTION

It is accordingly an object of the invention to provide a method and a device for timing the output of data packets from a network node, which make it possible to limit the jitter in a network node in a simple manner. In particular, it is an object of the invention to provide a method and a device for timing the output of data packets from a network node, which supports the transmission of time-critical services in the Internet.

With the foregoing and other objects in view there is provided, in accordance with the invention, a method for timing the output of data packets from a network node, that includes, in one cycle, performing the steps of: determining a current buffer memory fill level of a queue of a network node and thereby obtaining a determined current buffer memory fill level; comparing the determined current buffer memory fill level with a predetermined lower limit for the buffer memory fill level; and assigning an output time at which a data packet that is located in the queue will be output from the network node, in dependence on a result of the comparing step.

In other words, the method is based on determining the current buffer memory fill level of a queue of the network node. The buffer memory fill level that is determined is compared with a predetermined lower limit for the buffer memory fill level. Depending on the result of the comparison, the output of the data packet from the network node is then assigned at different times.

The method has the advantage that the arrival times of data packets at the inputs of the network node do not need to be noted. The continuous monitoring of the queue-based buffer memory fill level, which is to be performed instead, requires little expenditure and, in particular, no storage of data-packet-oriented information.

In accordance with an added mode of the invention, in an nth cycle, an output time $Ta(n)$ is determined for a data packet in accordance with the relationship $Ta(n)=Ts(n)+L/R$, where $Ts(n)$ is a reference time allocated to the nth cycle, L is the packet length of the data packet to be assigned and R is a bit rate for the output of the network node. The value of R depends on the result of the comparison. In this manner, the output time of a data packet is set at the output of the network node, taking into consideration the bit rate R.

The reference time $Ts(n)$ in the nth cycle is preferably the output time $Ta(n-1)$ of the data packet output in the preceding n−1th cycle.

In accordance with an additional mode of the invention, R is set to a bit rate Rmax if the measured buffer memory fill level is greater than the predetermined lower limit; otherwise, R is set to a bit rate Rmin which is less than Rmax. Rmax can suitably be a maximum permissible bit rate at the output of the network node (i.e. the link capacity).

In accordance with a further mode of the invention, in each cycle, the buffer memory fill level that is determined is compared with a predetermined upper limit for the buffer memory fill level, and if the current buffer memory fill level is greater than the upper limit, the next available data packet is marked and then immediately discarded (i.e. deleted). Defining an upper limit for the fill level of the buffer memory ensures that at all times, there are never many more data bits in the buffer memory than predetermined by this defined upper limit.

The method can be applied both to network nodes with switching or protocol transfer functions (router or gateway, respectively) and to all other network nodes, e.g. switches, bridges or hubs, etc.

Another aspect of the invention relates to a (data) network or network section or portion that exclusively consists of network nodes which are controlled in accordance with the inventive method. The network nodes can be different types and, in particular, also contain buffer memories of different sizes. By predefining the same lower limit and/or upper limit for the buffer memory fill level in each network node throughout the network, the data packet output is nevertheless controlled in accordance with the same rule in each network node. With reference to the determination of the upper limit, this allows for the possibility of specifying for each data stream through the network, the greatest possible number of data bits which can be temporarily stored at a maximum time in the network nodes of the network through which the data stream passes.

With the foregoing and other objects in view there also is provided, in accordance with the invention, a network node configuration that includes a network node. The network node includes: at least one queue with a buffer memory for temporarily storing data packets; determining means for determining a current fill level of the buffer memory and thereby obtaining a determined current fill level; and a control device for controlling an output of a data packet in dependence on the determined current fill level of the buffer memory. The control device is configured for: using the determining means to obtain the determined current fill level; comparing the determined current fill level with a predetermined lower limit; and assigning an output time at which a data packet that is located in the queue will be output from the network node, in dependence on a result of the comparing step.

In accordance with an added feature of the invention, the network node can be a router or a gateway.

In accordance with an additional feature of the invention, the network node can be a switch, a bridge, or a hub.

With the foregoing and other objects in view there also is provided, in accordance with the invention, a network or a network portion that includes a plurality of network nodes. Each one of the plurality of the network nodes includes: at least one queue with a buffer memory for temporarily storing data packets; determining means for determining a current fill level of the buffer memory and thereby obtaining a determined current fill level; and a control device for controlling an output of a data packet in dependence on the determined current fill level of the buffer memory. The control device is configured for: using the determining means to obtain the determined current fill level; comparing the determined current fill level with a predetermined lower limit; and assigning an output time at which a data packet that is located in the queue will be output from the one of the plurality of the network nodes, in dependence on a result of the comparing step.

In accordance with an added feature of the invention, the predetermined lower limit is used by the control device of each one of the plurality of the network nodes.

In accordance with an additional feature of the invention, the same predetermined upper limit, a so-called given predetermined upper limit, is used by the control device of each one of the plurality of the network nodes. The control device of each one of the plurality of the network nodes compares the given predetermined upper limit with the current fill level of the buffer memory.

In accordance with a concomitant feature of the invention, each one of the plurality of the network nodes has an output for outputting the data packet; and the control device of each one of the plurality of the network nodes uses a given maximum bit rate that is defined at the output of the one of the plurality of network nodes.

Other features which are considered as characteristic for the invention are set forth in the appended claims.

Although the invention is illustrated and described herein as embodied in a method for timing the output of data packets from network nodes, network node and configured network, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DESCRIPTION OF THE PREFERRED EMBODIMENTS

Figure 1:
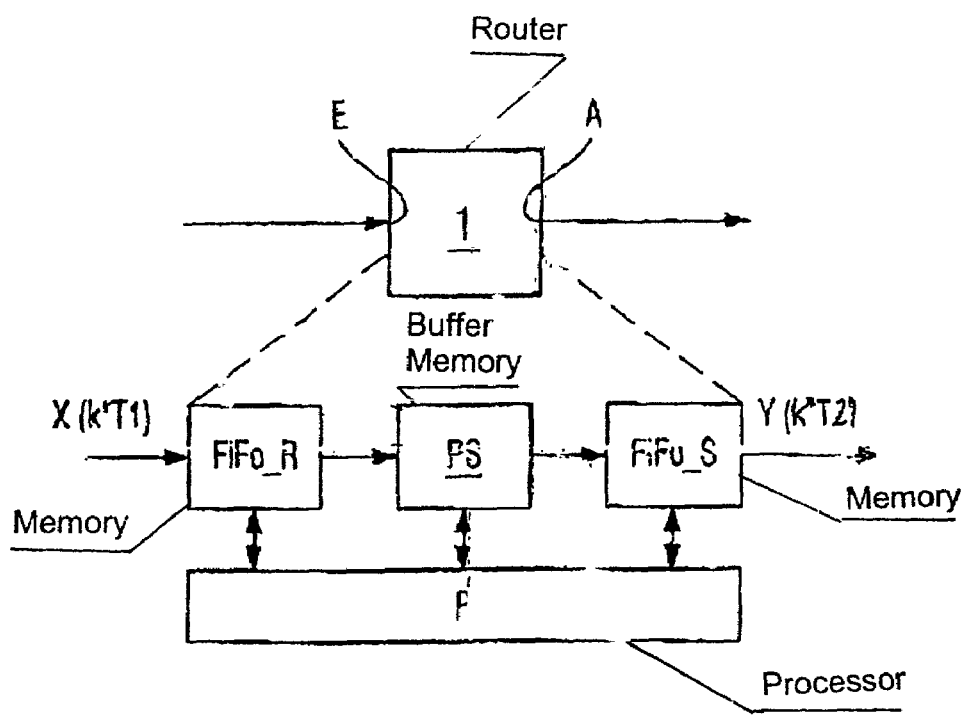
FIG. 1 shows a diagrammatic representation of a network node in a network.

Referring now to the figures of the drawing in detail and first, particularly, to FIG. 1 thereof, there is shown a router 1 that outputs, at an output A, one or more data streams arriving at its input E. The router 1 has other inputs and/or outputs that are not considered in the following text and which are not, therefore, drawn in FIG. 1. The data stream passing through the router 1 contains data bits that are transmitted in a packet-oriented manner, i.e. in individual data packets or cells (i.e. data packets of identical packet length).

The term data stream designates a sequence of data packets that originate from a particular transmitter and that are intended for a particular receiver. A data stream, therefore, corresponds to a particular transmitter-receiver connection.

With respect to the output A considered, the router 1 usually includes a number of queues arranged in parallel that are connected to the one output A via an interface. The structure of a queue is shown by way of example in the lower part of FIG. 1. The queue has a FiFo receive memory, labeled FiFo_R, that is coupled to the input E, a buffer memory PS following the receive memory FiFo_R, and a FiFo transmit memory, labeled FiFo_S, following the buffer memory PS. All of the memories are linked to a processor P in a bidirectional data link. The processor P controls the queue, i.e. the input, forwarding and output of data with respect to the individual memories FiFo_R, PS, FiFo_S.

Queue FiFo_R, PS, FiFo_S can be associated with a single data stream, or it is also possible for a number of data streams to be served by one queue when the order of the data packets with respect to the respective data stream must be maintained.

A TDM (Time Division Multiplex) transmission is being considered. The data stream received by the router 1 is periodically received in time slots with a period T1 and the data stream output is periodically transmitted in time slots having a period T2. $X(t)$ designates the number of bits which are received at the input E during the half-open time interval $(t-T1, t)$ and $Y(t)$ designates the number of bits which are output at the output A of the router 1 during the half-open time interval $(t-T2, t)$.

For an ideal time division multiplex transmission $T1=T2=:T$ and $Y(k*T)=X(k*T-D)$ applies for arbitrary times t and for a constant dwell time D. That is to say, the number of data output at the output A of the router 1 within the time interval under consideration is identical to the number of data received at the input E of the router 1 within the same time interval but delayed by the dwell time D. In this case, each data bit of the data stream considered has precisely the dwell time D in router 1. In this case, k designates a consecutive number for indexing successive time slots.

In practice, however, there are fluctuations around the "ideal" dwell time D of the data bits (and thus also of the data packets) in router 1. These fluctuations are called jitter J(t). The jitter J(t) with respect to D can be described in a time-dependent manner by the following equation:

$$J(t) = \int_0^{t-D} X(\tau)d\tau - \int_0^{t} Y(\tau)d\tau$$

A time-independent upper limit G for the jitter has the characteristic that the condition |J(t)|<G is satisfied for all times t.

In general, for a network node of any type it holds true that the jitter J(t) approximately corresponds to the fill level of the buffer memory in the network node. That is to say, when the storage capacity in buffer memory PS is exhausted (i.e. the buffer memory PS is completely filled), maximum jitter can be expected. The receive memory FiFo_R and the transmit memory FiFo_S are considered to be free of jitter in this context.

Figure 2:
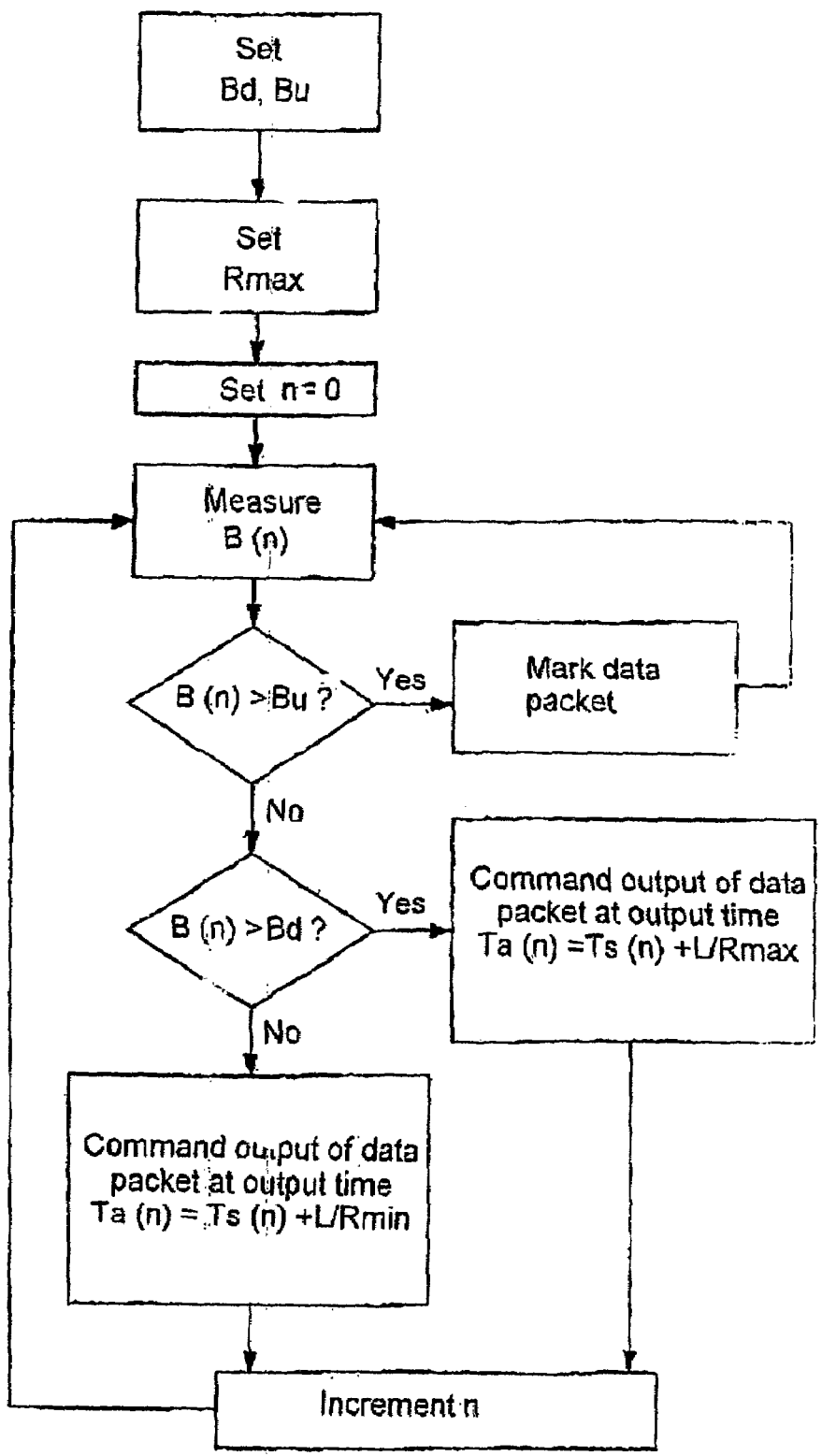
FIG. 2 shows a flow chart for explaining an illustrative embodiment of the inventive method.

The control of the output of data packets located in a queue will be explained with reference to FIG. 2. It is carried out via the processor P which is suitably programmed for this purpose.

Initially, a lower limit Bd is set for the fill level of the buffer memory PS in a first initialization step. In this step, an upper limit Bu for the fill level of the buffer memory PS can also be set.

In a next initialization step, a fixed maximum bit rate Rmax is predetermined for the output A of the router 1. Predetermining a maximum bit rate Rmax for the output A of the router 1 means that the derivative of Y(t) with respect to time is always less than this maximum output bit rate. In practice, this maximum bit rate Rmax at the output A of the router 1 (or another network node) is frequently set because of limitations by the network operator. For example, the limiting of the output bit rate (i.e. of the throughput) through the router 1 can be agreed and predetermined in dependence on charges for using the network.

The output of data packets from the buffer memory PS is then controlled in accordance with the following cycle. N designates a consecutive number of the cycle. The cycle is begun by setting n=0.

Initially, the current fill level B(n) of the buffer memory PS is determined in the nth cycle.

Then the current fill level B(n) is compared with the limits Bd and possibly Bu. If B(n)>Bu holds true, the fill level of the buffer memory PS is too high, i.e. the buffer memory PS must be immediately emptied. For this purpose, the next data packet for which the output time is to be defined is marked and then discarded. If B(n)≦Bu, a check is made as to whether B(n)>Bd holds true. If this is so, the output time Ta(n) for the next data packet available for dispatch in the buffer memory PS is determined in accordance with the equation Ta(n)=Ts(n)+L/Rmax. Here, L designates the length (i.e. the number of bits) of this data packet and Ts(n) designates a reference time for the nth cycle. For example, Ts(n)=Ta(n−1) can hold true, where Ta(n−1) is the (precalculated) output time of the last bit of the data packet assigned in the preceding cycle n−1.

Otherwise, i.e. if B(n)≦Bd holds true, Ta(n)=Ts(n)+L/Rmin is set. Rmin designates a bit rate of less than Rmax at the output A. Rmin represents a minimum guaranteed transmit rate of the router 1.

After this data packet has been scheduled, n is incremented and the cycle, which is now designated as Z(n+1), is repeated for the next data packet.

An alternate possibility (not shown in FIG. 2) for determining B(n)≦Bd is that initially no output time is allocated to the data packet to be assigned in the queue under consideration, and that the cycle is shifted to another queue, e.g. a queue having lower priority. In this case, data packets in this other queue are subsequently assigned in time. If the process changes back to the queue under consideration in the mth cycle, the output time Ta(m−1), already assigned, of the last bit of the data packet in the other queue, assigned in the preceding cycle m−1, can be used as the reference time Ts(m).

The algorithm described has the result that the system is in a "slow" operating mode (or in a waiting state in accordance with the alternative explained last) with respect to the queue being considered as long as the fill level of the buffer memory PS is less than the lower limit Bd. If the fill level B is above the lower limit Bd, the output time for a data packet is timed in each cycle in accordance with the equation specified above, with the increased rate Rmax. This "fast" operating mode is maintained until the fill level of the buffer memory PS drops below the lower limit Bd (again). It is only for the case when the fill level of the buffer memory PS is greater than Bu that no output time is assigned to a data packet, but the packet is marked and discarded.

Figure 3:
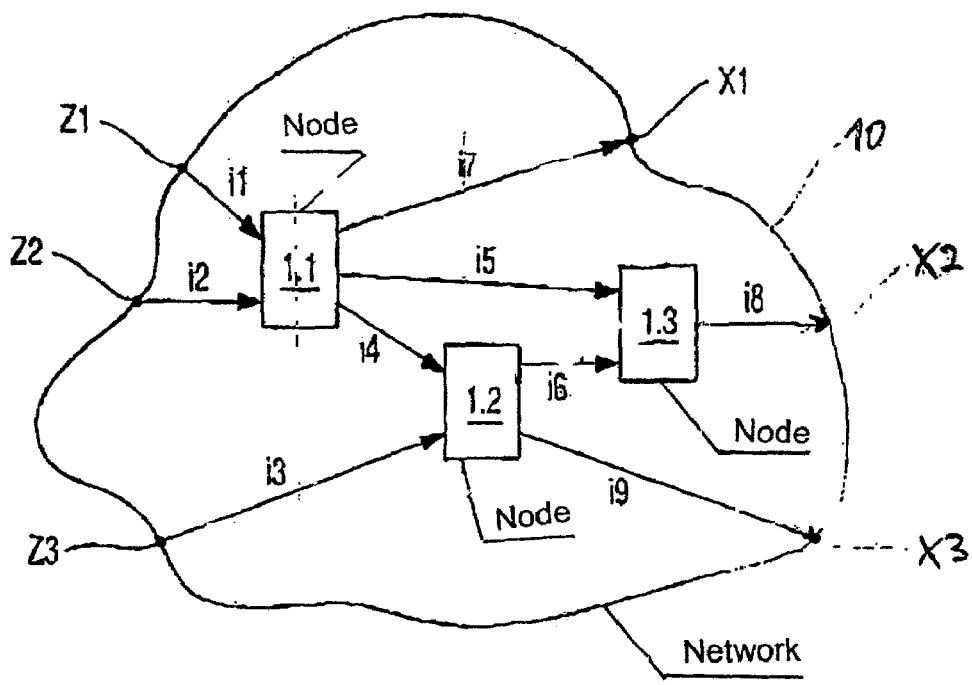
FIG. 3 shows a diagrammatic representation of a network section.

FIG. 3 shows a network 10 or, respectively, a section of a network, which includes three network nodes 1.1, 1.2 and 1.3 having a structure according to FIG. 1. The data streams i1, i2 and i3 are supplied to the network 10 at interchange points Z1, Z2 and Z3. The data streams i1 and i2 pass to the first network node 1.1 while data stream i3 is directed to the second network node 1.2. An output data stream i4 forms another input data stream for the network node 1.2. Data streams i5 and i6 are directed to the third network node 1.3. Data streams i7, i8 and i9 are supplied to output points X1, X2 and X3 of the network 10.

Although the network nodes 1.1, 1.2 and 1.3 can be different in type and construction, particularly with regard to the size of the buffer memory, a low-jitter data transmission is ensured in the network when the network nodes 1.1, 1.2, 1.3 are uniformly configured with regard to Bu and/or Bd. In particular, a uniform upper limit Bu for the buffer memory fill level can ensure that the data bits stored in the network for a particular data stream are limited. Considered is, for example, a data stream from Z2 to X3. This is composed of data stream sections i2, i4 and i9. It passes through two network nodes, namely 1.1 and 1.2. Due to the abovementioned uniform design of the network nodes with respect to Bu throughout the network, it holds true that the number of data bits stored in the network for this data stream is less than or equal to 2*Bu.

I claim:

1. A method for timing an output of data packets from a network node, which comprises, in one cycle:
    determining a current buffer memory fill level of a queue of a network node and thereby obtaining a determined current buffer memory fill level;

comparing the determined current buffer memory fill level with a predetermined lower limit for a buffer memory fill level; and assigning an output time at which a data packet that is located in the queue will be output from the network node, in dependence on a result of the comparing step;

in an nth cycle, in the assigning step, determining the output time Ta(n) in accordance with Ta(n)=Ts(n)+L/R, where:
Ts(n) is a reference time allocated to the nth cycle,
L is a packet length of the data packet to be assigned,
R is a bit rate at an output of the network node, and
a value of R depends on the result of the comparing step.

2. The method according to claim 1, wherein the reference time Ts(n) is an output time Ta(n−1) of p data packet output in a preceding n−th cycle.

3. The method according to claim 2, which comprises:
setting R to a bit rate Rmax if the determined current buffer memory fill level is greater than the predetermined lower limit; and
otherwise, setting R to a bit rate Rmin that is less than Rmax.

4. The method according to claim 1, which comprises:
setting R to a bit rate Rmax if the determined current buffer memory fill level is greater than the predetermined lower limit; and
otherwise, setting R to a bit rate Rmin that is less than Rmax.

5. The method according to claim 4, wherein Rmax is a maximum permissible bit rate at the output of the network node.

6. The method according to claim 1, which comprises:
comparing the determined current buffer memory fill level with a predetermined upper limit for the buffer memory fill level; and
if the current buffer memory fill level is greater than the upper limit, then discarding the data packet to be assigned.

7. A network node configuration, comprising:
a network node, including:
at least one queue with a buffer memory for temporarily storing data packets;
determining means for determining a current fill level of the buffer memory and thereby obtaining a determined current fill level; and
a control device for controlling an output of a data packet in dependence on the determined current fill level of the buffer memory;
said control device configured for:
using the determining means to obtain the determined current fill level;
comparing the determined current fill level with a predetermined lower limit; and
assigning an output time at which a data packet that is located in the queue will be output from the network node, in dependence on a result of the comparing step;
in an nth cycle, in the assigning step, determining the output time Ta(n) in accordance with Ta(n)=Ts(n)+L/R, where:
Ts(n) is a reference time allocated to the nth cycle,
L is a packet length of the data packet to be assigned,
R is a bit rate at an output of the network node, and
a value of R depends on the result of the comparing step.

8. The network node according to claim 7, wherein said network node is embodied in the group consisting of a router and a gateway.

9. The network node according to claim 7, wherein said network node is embodied in the group consisting of a switch, a bridge, and a hub.

10. A network portion, comprising:
a plurality of network nodes, each one of said plurality of said network nodes, including:
at least one queue with a buffer memory for temporarily storing data packets;
determining means for determining a current fill level of the buffer memory and thereby obtaining a determined current fill level; and
a control device for controlling an output of a data packet in dependence on the determined current fill level of the butter memory;
said control device configured for:
using the determining means to obtain the determined current fill level;
comparing the determined current fill level with a predetermined lower limit; and
assigning an output time at which a data packet that is located in the queue will be output from said one of said plurality of said network nodes, in dependence on a result of the comparing step;
in an nth cycle, in the assigning step, determining the output time Ta(n) in accordance with Ta(n)=Ts(n)+L/R, where:
Ts(n) is a reference time allocated to the nth cycle,
L is a packet length of the data packet to be assigned,
R is a bit rate at an output of the network node, and
a value of R depends on the result of the comparing step.

11. The network portion according to claim 10, wherein the predetermined lower limit is used by said control device of each one of said plurality of said network nodes.

12. The network portion according to claim 10, wherein:
a given predetermined upper limit is used by said control device of each one of said plurality of said network nodes; and
said control device of each one of said plurality of said network nodes compares the given predetermined upper limit with the current fill level of said buffer memory.

13. The network portion according to claim 10, wherein:
each one of said plurality of said network nodes has an output for outputting the data packet; and
said control device of each one of said plurality of said network nodes uses a given maximum bit rate that is defined at said output of said one of said plurality of network nodes.

* * * * *